United States Patent
Rapp

(10) Patent No.: US 7,177,074 B2
(45) Date of Patent: Feb. 13, 2007

(54) CIRCUIT AND METHOD FOR SAFETY SHUTDOWN OF AN OPTICAL AMPLIFIER

(75) Inventor: Lutz Rapp, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 153 days.

(21) Appl. No.: 10/247,410

(22) Filed: Sep. 18, 2002

(65) Prior Publication Data

US 2003/0174392 A1 Sep. 18, 2003

(30) Foreign Application Priority Data

Sep. 18, 2001 (DE) ................. 101 46 001

(51) Int. Cl.
*H01S 3/00* (2006.01)
*H04B 10/08* (2006.01)

(52) U.S. Cl. .................. 359/341.43; 359/341.44; 398/15; 398/37

(58) Field of Classification Search ........... 359/341.43, 359/341.44; 398/15, 37
See application file for complete search history.

(56) References Cited

U.S. PATENT DOCUMENTS

| 5,442,479 | A | * | 8/1995 | Bulow et al. | ........... 359/341.44 |
|---|---|---|---|---|---|
| 5,539,570 | A | | 7/1996 | Ushirozawa | ........... 359/341.44 |
| 5,633,749 | A | * | 5/1997 | Shibuya | ................. 359/341.43 |
| 5,680,246 | A | * | 10/1997 | Takahashi et al. | ...... 359/341.43 |
| 5,805,319 | A | | 9/1998 | Chuzenji | ..................... 398/18 |
| 5,859,725 | A | * | 1/1999 | Sugiya et al. | .......... 359/337.13 |
| 6,008,915 | A | * | 12/1999 | Zyskind | ....................... 398/34 |
| 6,016,213 | A | * | 1/2000 | Farber et al. | ............... 398/177 |
| 6,064,501 | A | * | 5/2000 | Roberts et al. | ................ 398/11 |
| 6,064,514 | A | * | 5/2000 | Aoki et al. | ............ 359/341.43 |
| 6,433,926 | B2 | * | 8/2002 | Pedersen et al. | ........ 359/341.43 |
| 6,507,420 | B1 | * | 1/2003 | Johansson | ..................... 398/34 |
| 6,519,081 | B2 | * | 2/2003 | Lelic et al. | ............. 359/341.4 |
| 6,553,159 | B1 | * | 4/2003 | Raiti | ........................... 385/15 |
| 6,583,899 | B1 | * | 6/2003 | Casanova et al. | ............... 398/9 |

FOREIGN PATENT DOCUMENTS

| DE | 42 39 187 | 5/1994 |
|---|---|---|
| DE | 42 39 187 A | 5/1994 |
| EP | 0 853 394 | 7/1998 |
| GB | 2 322 027 | 8/1998 |

* cited by examiner

Primary Examiner—Deandra M. Hughes
(74) Attorney, Agent, or Firm—Bell, Boyd & Lloyd LLC

(57) ABSTRACT

A circuit and associated method for safety shutdown of an optical amplifier, wherein the power of an amplified spontaneous emission ASE is subject to a correction factor and subtracted from a measured signal extracted from the optical signal.

11 Claims, 2 Drawing Sheets

(12)...

CIRCUIT AND METHOD FOR SAFETY SHUTDOWN OF AN OPTICAL AMPLIFIER

BACKGROUND OF THE INVENTION

The term amplifier is used below to describe a device which can be used to increase the intensity of an optical beam.

FIG. 1 shows a segment of a section of optical waveguide. An optical waveguide L is connected via an optical connector S to an optical amplifier V. Optimum noise behavior of an optical amplifier, in particular an erbium doped fiber amplifier, results if the amplifier does not have isolators on the input side. Amplified spontaneous emission ASE caused by the optical amplifier spreads counter to the direction of spread of the optical signal on the optical waveguide and is, for example, reflected via a connector S and fed back to the input of the amplifier.

In order to achieve safety shutdown of the optical amplifier in the event of interruption, components of the optical signal directed to the input of the optical amplifier V can be fed to a monitoring unit via an optical coupler in appropriate transfer systems. This monitoring unit is, for example, made up of a filter, particularly a band-pass filter, and a signal monitor downstream from this. If the measured power is below a predefined threshold value, it is assumed that the optical waveguide section is interrupted, which, for example, triggers safety shutdown of the optical amplifier. If the measured power is above the predefined threshold value, safety shutdown does not take place, as it is assumed that optical signals have reached the measuring device via the optical waveguide section and, therefore, there can be no interruption.

In the case of interruption, however, a power reading above the predefined threshold value may be measured under certain circumstances due to reflection of the amplified spontaneous emission ASE at a connector S at the input of the amplifier and this is interpreted as the input signal, so the mandatory safety shutdown does not take place.

To ensure shutdown in the event of an interruption, optical amplifiers are therefore fitted with isolators on the input side.

This has the advantage that amplified spontaneous emission ASE spreading counter to the direction of spread of the optical data signal is avoided.

The use of an isolator, however, such as a passive element, has the disadvantage that the noise level increases and, as a result, the intervals between the regenerators along the optical transfer section are reduced.

An object of the present invention is to specify a circuit and a method for safety shutdown of an optical amplifier.

SUMMARY OF THE INVENTION

The present invention has the advantage that, as well as not requiring an isolator at the amplifier input, the amplifier used does not have to have specific dimensions.

The present invention has the further advantage that the intervals between the regenerators along the optical waveguide section are not reduced.

Accordingly, in an embodiment of the present invention, a circuit is provided for safety shutdown of an optical amplifier, which includes a first unit for analyzing an optical signal supplied in an optical waveguide, a second unit for measuring an amplified spontaneous emission directed in the optical waveguide, and a decision unit to which a measured value of the optical signal minus the amplified spontaneous emission is fed.

In an embodiment, the first unit of the circuit includes a coupler for detecting the optical signal directed in the optical waveguide, a band-pass filter connected to the coupler and a signal monitor for measuring power connected downstream from the band-pass filter.

In an embodiment, the second unit of the circuit includes a device for measuring power of the amplified spontaneous emission or components of the output signal of the band-pass filter.

In an embodiment, the circuit further includes a link unit between the first unit and the second unit for estimation purposes for the optical signal launch into the optical amplifier.

In an embodiment, the link unit of the circuit has a multiplier and a subtractor, in which an output signal of the second unit is multiplied by a correction factor in the multiplier and subtracted in the subtraction unit from the output signal of the signal monitor located in the first unit.

In an embodiment, the circuit further includes a decision unit to which an output signal of the link unit is fed and the optical amplifier can be controlled using an output signal of the decision unit.

In a further embodiment of the present invention, a method is provided for safety shutdown of an optical amplifier, in which an optical signal directed in an optical waveguide is analyzed, wherein the method includes the steps of detecting an amplified spontaneous emission directed in the optical waveguide, and subtracting from a measured value of the optical signal the amplified spontaneous emission.

In an embodiment, the method further includes the steps of extracting components of the optical signal from the optical waveguide, and feeding the extracted components to a band-pass filter and a signal monitor downstream from the band-pass filter.

In an embodiment, the method further includes the steps of feeding at least some of the signal components outside the pass range of the band-pass filter to a power measurement device.

In an embodiment of the method, signal power is determined from signal components measured inside and outside the pass range of the band-pass filter.

In an embodiment, the signal power outside the pass range of the band-pass filter is multiplied by a correction factor and subtracted from the signal power inside the pass range.

Additional features and advantage of the present invention are described in, and will be apparent from, the following Detailed Description of the Invention and the Figures.

DETAILED DESCRIPTION OF THE INVENTION

Figure 1:
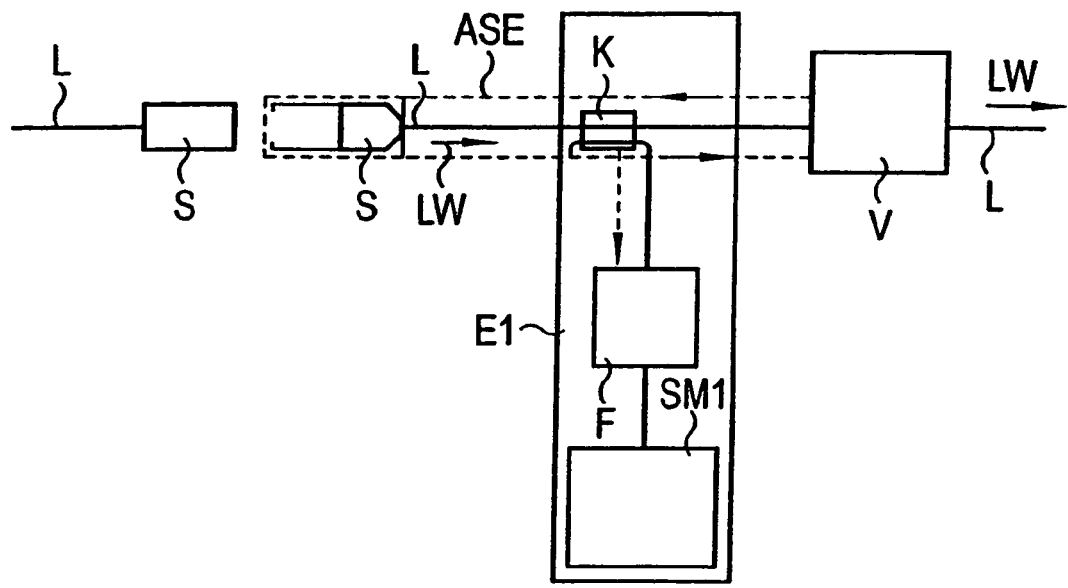
FIG. 1 shows a block circuit diagram corresponding to the prior art.
Figure 2:
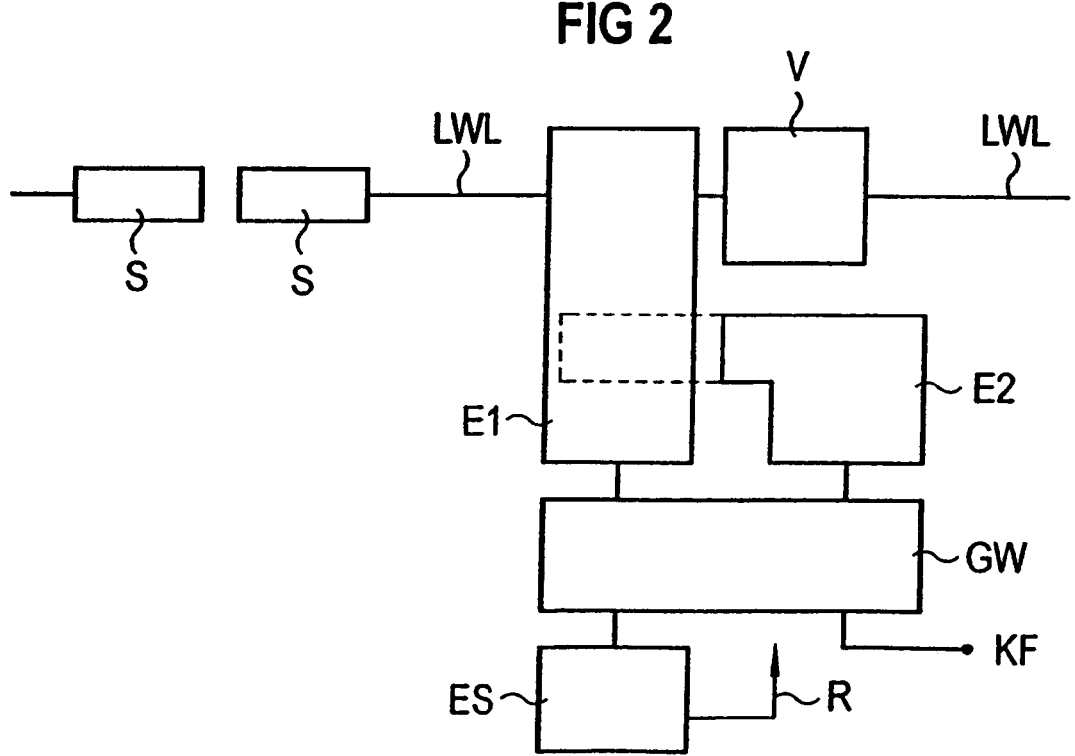
FIG. 2 shows a block circuit diagram of a circuit for safety shutdown of an optical transmitter.

FIG. 2 shows a block circuit diagram of a circuit for the safety shutdown of an optical amplifier. In this circuit, a second unit E2 for measuring amplified spontaneous emission ASE and a link unit GW to link the two output signals of the first and second units E1, E2 are added to the circuit in FIG. 1. The output signal of the link unit GW is then fed to a decision unit ES for analysis.

A more detailed embodiment of the block circuit diagram shown in FIG. 2 is described below and illustrated in FIG. 3.

Figure 3:
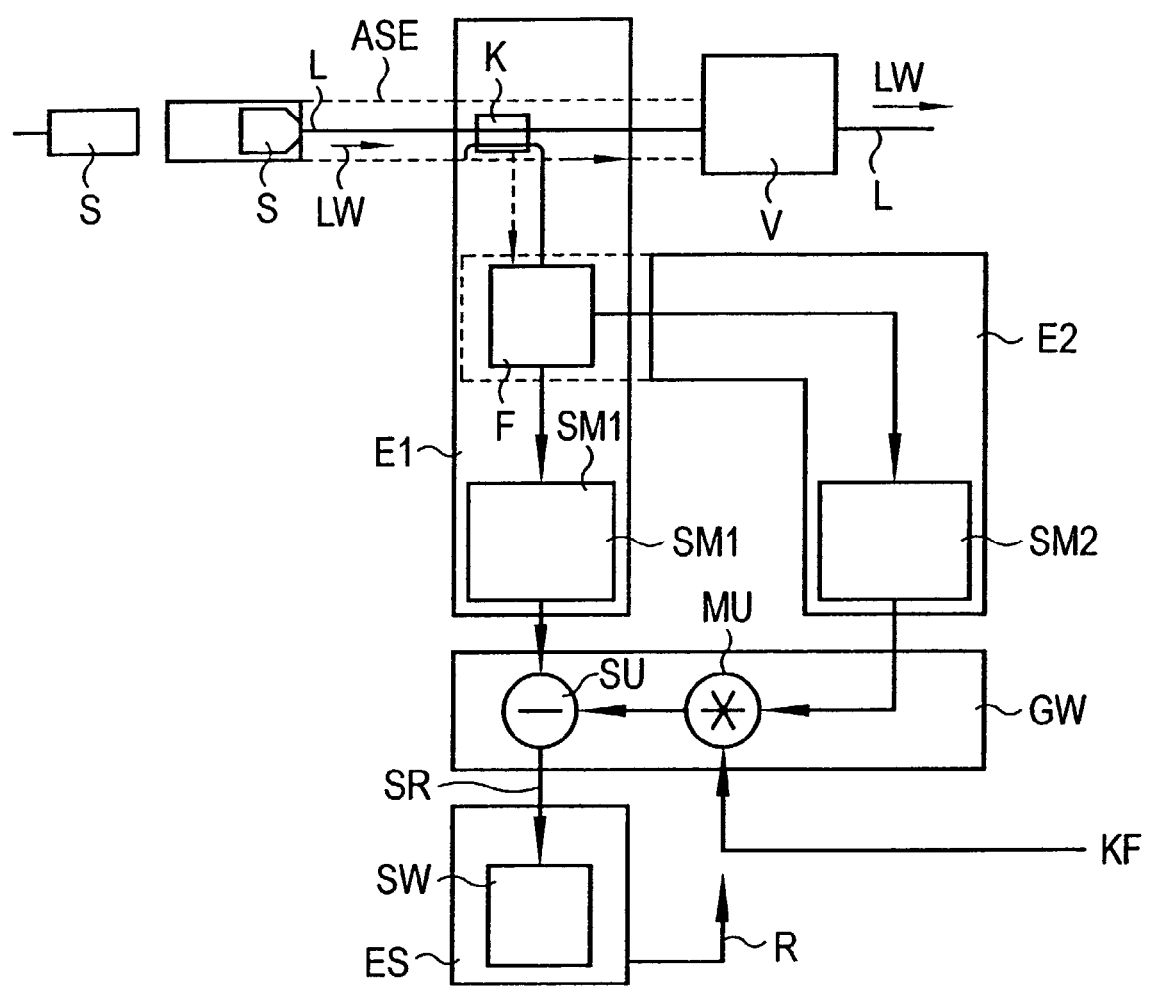
FIG. 3 shows an embodiment of the block circuit diagram shown in FIG. 2.

FIG. 3 shows an embodiment of a circuit for safety shutdown of an optical amplifier. A pump laser, for example, is used for optical amplification of the optical signals. In a second unit E2 there is a device to measure power; specifically, an amplified spontaneous emission ASE signal monitor SM2. With this configuration, as shown in FIG. 3, the optical signal LW extracted from the optical waveguide L is reduced by the amount of amplified spontaneous emission ASE overlaying the optical signal LW. The amplified spontaneous emission ASE is estimated using the power measured outside the signal band of the extracted optical signal LW and subtracted from the detected input power of the optical signal. This separation of inside and outside signal components can, for example, be achieved with a band-pass filter. Band-pass filter is used to refer to any device for the spectral separation of power components. Spectral separation also can be carried out, for example, using an optical spectrum analyzer. Light power outside the wavelength band of the transferred optical signal is detected by the second decision unit E2. This amplified spontaneous emission ASE occurring outside the wavelength band of the optical signal LW is used to estimate the amplified spontaneous emission ASE overlaid in the optical signal LW. This power multiplied by a correction factor KF is subtracted from the input power of the optical signal, so a signal power is obtained for the optical signal LW. The power of the optical signal LW is then, for example, fed to a threshold decision device SW in the decision unit ES and the optical amplifier V is shut down if the value is below a definable threshold value.

Estimation of the amplified spontaneous emission ASE contained in the optical signal LW should be as high as possible. In the most extreme case, the spectral form of the amplified spontaneous emission ASE is taken as a basis with almost 100% inversion in the amplifier input. This estimation can be verified using auxiliary modules. The pump power launched into the optical waveguide also can be taken into account in the correction of the amplified spontaneous emission ASE measured in the second unit E2.

If, for example, a reflection filter F is used, as shown in FIG. 3, one filter is sufficient both to restrict the measured bandwidth of the signal monitor SM1 to the wavelength range occupied by the signal values and to determine the amplified spontaneous emission ASE occurring outside this wavelength range. In further embodiments of the circuit shown in FIG. 3, it may be advantageous to position an additional narrow-band filter in front of the band-pass filter F, so that only those frequency components are used to estimate the amplified spontaneous emission ASE to be subtracted, which are very close to the signal band of the optical signal. This is advantageous, for example, in a WDM system, in which a band filter is used to separate C band and L band components.

Although the present invention has been described with reference to specific embodiments, those of skill in the art will recognize that changes may be made thereto without departing from the spirit and scope of the present invention as set forth in the hereafter appended claims.

The invention claimed is:

1. A safety-shutdown circuit of an optical amplifier, comprising:
    a first unit arranged in front of the optical amplifier wherein the first unit detects an optical signal at an input of the amplifier supplied in an optical waveguide;
    a second unit that measures a reflected amplified spontaneous emission directed in the optical waveguide along with the optical signal; and
    a decision unit to which a measured value of the detected optical signal is fed, wherein the measured amplified spontaneous emission is subtracted from the measured value of the optical signal and wherein decision unit forms a shutdown signal for transmission to said amplifier.

2. A safety-shutdown circuit of an optical amplifier as claimed in claim 1, wherein the first unit includes a coupler that detects the optical signal directed in the optical waveguide, a band-pass filter connected to the coupler and a signal monitor that measures power connected downstream from the band-pass filter.

3. A safety-shutdown circuit of an optical amplifier as claimed in claim 2, wherein the second unit includes a device that measures power of components of an output signal of the band-pass filter.

4. A safety-shutdown circuit of an optical amplifier as claimed in claim 1, further comprising a link unit between the first unit and the second unit that assist in estimating the optical signal launched into the optical amplifier.

5. A safety-shutdown circuit of an optical amplifier as claimed in claim 4, wherein the link unit includes a multiplier and a subtractor in which an output signal of the second unit is multiplied by a correction factor in the multiplier and subtracted in the subtraction unit from the output signal of the signal monitor located in the first unit.

6. A safety-shutdown circuit of an optical amplifier as claimed in claim 5, further comprising a decision unit to which an output signal of the link unit is fed, wherein an output signal of the decision unit controls the optical amplifier.

7. A method for safety shutdown of an optical amplifier, in which an optical signal directed in an optical waveguide is analyzed, the method comprising the steps of:
    detecting the power of a reflected amplified spontaneous emission directed in the optical waveguide;
    forming a measured value of the optical signal by subtracting the detected power reflected amplified spontaneous emission from the optical signal; and
    forming a shutdown signal based off of said measured value.

8. A method for safety shutdown of an optical amplifier as claimed in claim 7, the method further comprising the steps of:
    extracting components of the optical signal from the optical waveguide; and
    feeding the extracted components to a band-pass filter and a signal monitor downstream from the band-pass filter.

9. A method for safety shutdown of an optical amplifier as claimed in claim 8, the method further comprising the step of feeding at least some of spectral components outside a pass range of the band-pass filter to a power measurement device.

10. A method for safety shutdown of an optical amplifier as claimed in claim 9, wherein signal power is determined from signal components measured inside and outside the pass range of the band-pass filter.

11. A method for safety shutdown of an optical amplifier as claimed in claim 10, wherein the signal power outside the pass range of the band-pass filter is multiplied by a correction factor and subtracted from the signal power inside the pass range.

* * * * *